Sept. 30, 1924.
D. B. CARR
1,510,076
GRADING MACHINE
Filed Feb. 15, 1923    3 Sheets-Sheet 1
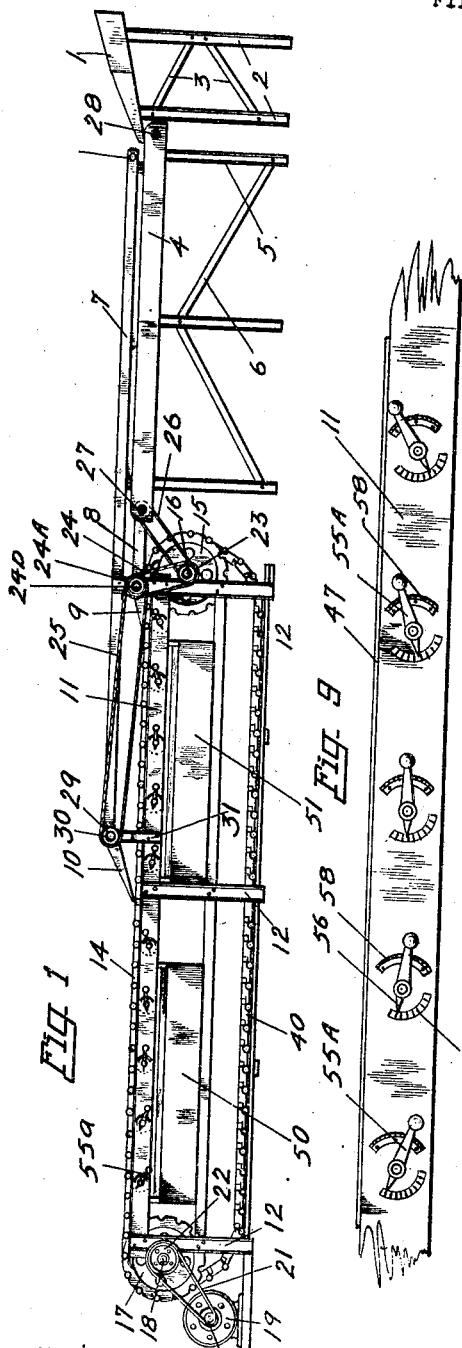
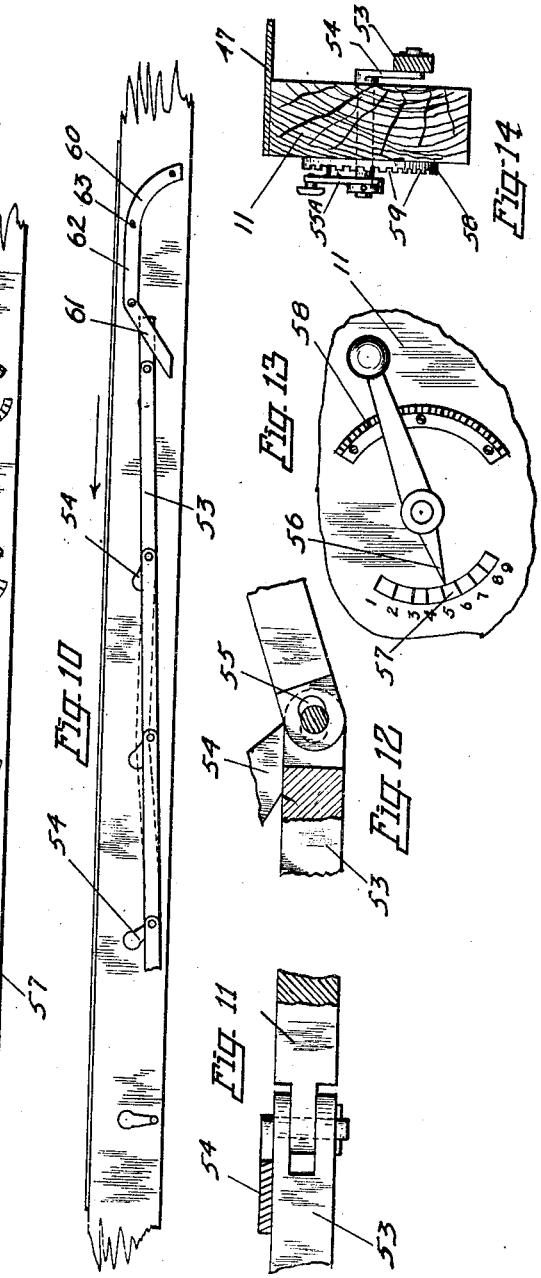
Witnesses
Inventor
David B Carr
Attorney

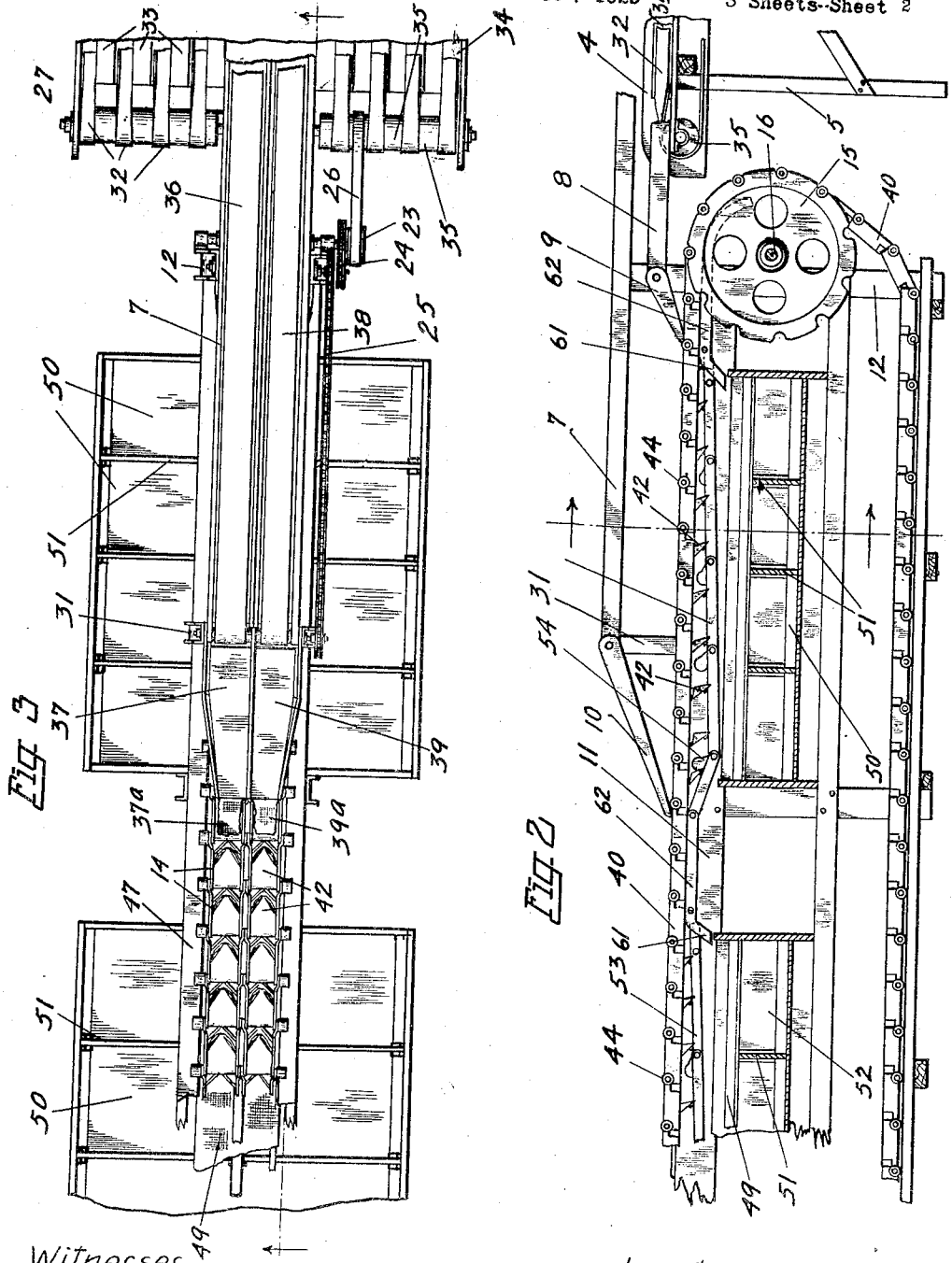

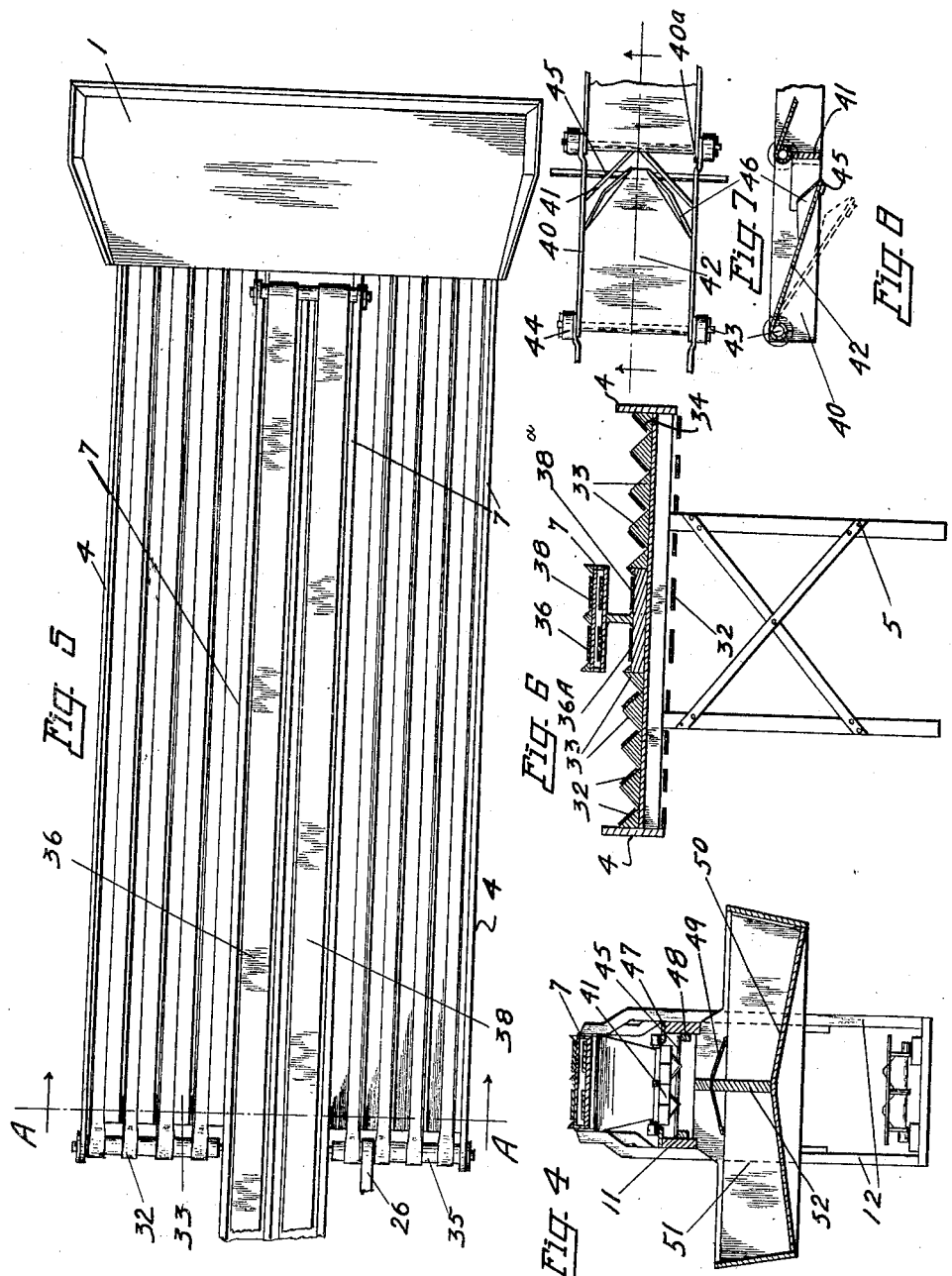

Patented Sept. 30, 1924.

1,510,076

UNITED STATES PATENT OFFICE.

DAVID B. CARR, OF PORTLAND, OREGON.

GRADING MACHINE.

Application filed February 15, 1923. Serial No. 619,251.

*To all whom it may concern:*

Be it known that I, DAVID B. CARR, a citizen of the United States, residing at 4625 East 60th Street, in the city of Portland, in the county of Multnomah and the State of Oregon, have invented a new and useful Grading Machine for the use of fruit growers and fruit packers, vegetable growers, cannery men, and manufacturers and others who have fruits or vegetables or other material that they wish to segregate into different sizes, of which the following is a specification.

My invention primarily consists of a series of bucket carriers composing a chain and as the chain progresses along its line of travel a movable bottom progressively opens, thereby permitting stated sizes of the materials to be sorted to be deposited at predetermined points in the travel of the chain, my invention is so arranged that when all of the sizes have been provided for, the bottoms composing the bucket are then raised up and the cycle of operation is then repeated one or more times, all in one machine, the invention is also arranged that more than one line of buckets may compose the chain, thereby giving the machine a maximum capacity for the width consumed, and an unlimited capacity in length, this requires but one power unit, and one feeding unit irrespective of the capacity of the machine. The buckets and the movable bottom are composed of rigid materials which permit of a much more rapid operation of the machine than is at the present permissible by any of the machines now on the market.

One of the main advantages of my invention is to provide a machine that makes possible an adjustment that will permit the deposit of practically all of one size of the material to be handled or segregated at any desired location within the travel of the segregator belt, this is very essential if the machine is to be used on orchard or other farm products, as in certain sections of the same orchard or vegetable field the size may run very uniform and practically all of the product will be deposited in the same sized bins, and in another part of the orchard or field the size will be larger or smaller. My machine makes possible without the stopping of the machine an adjustment by the attendant to accommodate the machine to this condition of the necessity of adapting the machine while in operation to segregate different sizes for deposit at points in the travel of the segregator chain to be determined by the requirements of the material to be sized. The machine also has the elements within its construction to set the same so that a uniform gradient may be established making possible the uniform sorting as to size into the bins to be determined at the time of the setting of the machine that will not vary during an entire run or an entire season. The sorting is done by gravity and no handling of the material is necessary after the same passes the sorting table, therefore a minimum handling of the material is necessary and the same is segregated by the gravity action upon the hinged bottom of the chain into which one each of the material to be segregated is deposited. The machine is economical to construct because the segregator chain itself forms the vehicle for segregation itself.

The sorting table is one of the most important parts of a machine of this kind for it is possible for the machine to size the different grades and place them in bins or hoppers for that purpose but it is necessary for the machine to have at the point of origin of the materials to be sorted and segregated sorters who pass upon the grade of the article. The materials are first placed in a hopper which is tilted to a slight incline to the horizontal in such manner that the articles to be graded gravitate down upon the sorting table. In my machine the sorting table has a series of transverse belts running transversely the table of the sorting platform. These belts carry the articles to be graded or sorted past the graders who select the different grades. The belts are operating in V shaped grooves and are, therefore, running at an approximate forty five degree angle to the horizontal, these belts therefore, carry the articles to be graded down these grooves and in doing so, since one side of the groove, which is the belt, moving, and the opposite side of the groove is stationary, the article is caused to revolve or rotate as it passes down the groove, and the graders have every advantage of inspecting the article as to grade. This principle I believe to be absolutely new in devices for this purpose, for it makes possible for a much more complete inspection, and at the same time, enables each grader to handle a much larger volume of materials with less effort, for it, only, remains for the graders to pick the material or article from the grooves as it passes, the revolving of the same having made it possible for a complete inspection before the same had been picked up, and the eye having made the inspection as to grade or quality in advance.

Running parallel with the sorting belts transversely with the sorting table are a series of conveyor belts here shown as four in number, each of which corresponds to a grade of the article being graded, and as the sorters determine the grade of the article the same is then deposited upon the proper conveyor belt to which the grade belongs, this conveyor belt then carries the article, so selected, along and deposits the same upon the segregator chain through the medium of a shoot at the end of the conveyor belt. These shoots are so arranged that they deposit the article to be sized upon the hinged bottom, at the bottom of a pocket shaped cup, the bottom then gradually hinges down and permits the article to be deposited at a point which is prearranged, as the hinging down action of the bottom takes place an increase in amount of opening is occurring until the article to be sized finally drops through the opening thus made. The machine operator may change the point of deposit of articles of a similar size by making adjustments of the machine without even stopping the same. When the hinged bottom, by the dropping down action, has opened sufficiently, the article is deposited upon a flexible diaphragm and from there gravitates into a bin or hopper for the size to which it belongs.

The segregator chain is endless and continuous and may be made in any desired length, as many different units of length as is desired may be made into one chain and the point of deposit from the sorting table be made to deposit the material to be segregated at the new point of pick up. In some districts of the United States orchard rum is segregated into five different sizes while in certain portions of the United States particularily here in the Northwest as many as nine different sizes are required of a machine to make the complete segregation. The number of segregations required will depend upon and determine the length of the machine for a certain capacity. It may also be necessary in making a machine of large capacity to place one or more chains side by side using the same cross bars and inclines to run the segregator chain upon, this is the economical way for in so doing but one set of bins, one sorting table, and one prime mover will be required for each machine, and a much greater capacity may be secured by so doing.

For a better and more complete understanding of my machine reference is made to the accompanying drawings in which—

Figure 1 is a side elevational view showing a complete assembly of my picking and sorting table, Figure 2 is a fragmentary side elevational view of the sorting table, Figure 3 is a plan view of the portion of the machine shown in Fig. 2, Figure 4 is a cross-sectional view taken on the arrow lines of Fig. 2, Figure 5 is a plan view of the picking table, Figure 6 is a cross-sectional view taken on the arrow lines of Fig. 5, Figure 7 is a plan view of a portion of the segregator chain shown in enlarged section, Figure 8 is a longitudinal sectional view taken on the arrow lines of Fig. 7, Figure 9 is a fragmentary side-elevational view of the track adjusting levers as clearly shown in Fig. 1, Figure 10 is a fragmentary side elevational view of the adjustable track, Figure 11 is a fragmentary plan view shown partly in section of one of the joint sections of the adjustable track and its support, Figure 12 is a fragmentary side elevational view shown partly in section of Fig. 11, Figure 13 is an enlarged side elevational view of one of the track adjusting levers, and Figure 14 is a sectional view of the side rail which supports the track adjusting lever, the latter being shown in side elevation.

For a more thorough and a complete understanding of my invention reference is made to the accompanying drawings and figures and in which like numerals and other identification marks refer to like parts throughout the several views:

Referring to Fig. 1—1 is the feeding hopper into which the material to be segregated is deposited, 2 are the supports for the same which may be made of wood, or steel, or other rigid material, and 3 are the cross supports or braces for holding the same in line and place. 4 are the rails or side plates of the sorting table and are purposely made somewhat wide for it is against these members that the attendants and sorters of the machine stand and come in bodily contact with the same, 5 are the supports for the same and 6 the braces or other supports for it to give the same rigidity and strength; this table and the construction of the same with the belts that are a part of its construction is one of the main features of my invention, and is a great advance over anything now in use. 7 is the side members of the transfer belts for depositing the sorted fruit from the sorting belt and depositing the same upon the segregated chain at the point required and that point depends upon the different sizes and grades that my machine is to be utilized for in the handling of the same. It may be well to state that these transfer belts may be placed one above the other depending upon the length of the machine and the number of grades that it is desired to segregate the materials into that are to be passed over the machine. In the machine shown in this view in Fig. 1 these transfer belts or conveyors are in two stages 7 and 8 one above the other. 9 and 10 are shoots made from pliable and flexible material that are for the purpose of transferring the material to be segregated from these conveyors and depositing the same upon the segregator chain proper and therefore must be made of material suitable for the work, in the handling of farm products I have found canvas or thin rubber well adapted for this purpose. 11 is the side frames of the segregator chain supports, and 12 are the supports for the same and 14 are the side links of the segregator chain, 15 is the driven sprocket about which the segregator chain passes and revolves about shaft 16, 17 is the driving sprocket about which the segregator chain passes and with which it engages, the same revolving about shaft 18, 19 is the prime mover which is here shown as an electric motor but I do not wish to be limited to the use of an electric motor for it is apparent that any form of a prime mover may be used such as an engine either gas or steam, or the power may be taken directly from a main line shaft that is used for the driving of other machines as well as that of my invention here shown, the shaft of the prime mover has a pulley 20 or sprocket means may be used if a chain drive instead of a belt is to be used for transmitting the power from the prime mover and 21 is the medium for connecting and delivering the power from the prime mover to the shaft 18, to this shaft 18 the sprocket 17 and the pulley or sprocket 22 are secured, to the shaft 16 sprocket 23 is made fast and about which chain 24 works and is driven the same passing around sprocket 24ᵃ and is made fast to shaft 24ᵇ, chain 25 also passes around a driven sprocket, also, secured to this shaft, and also passes around sprocket 29. Where the machine is to be used in a large packing plant the distributing belts or conveyors are placed one above the other in order that a larger number of graders may be employed about the sorting table, this is well shown in Fig. 1 where two different and distinct conveyors 7 and 8 are in use. Leading from the feeding hopper are a series of endless transfer belts being driven by passing around a roller or drum 35 that operates in a horizontal position but as the same leave the surface of the drum they are passed over an incline in such a manner that they are tilted at an angle to the horizontal approximating forty five degrees to the horizontal, and the side opposite these belts is composed of polished material and forms an angle of approximately ninety degrees between the surface of the belt and the polished surface 33 this forms a V shaped surface down which the articles to be graded are carried by the action of the belts, the materials are placed within the feeding hopper 1 and are then picked up by these belts and carried down the belts, the sorters picking up the different grades and placing the same upon the conveyors, leading to the segregator chains. The machine as illustrated herein may be used for two different grades and a multiplicity of sizes, or the same may be used for four different grades and a multiplicity of sizes and therein is one of the main and distinct advantages of my invention, for it enables the packing house to adapt the machine on almost instant notice to a change from grades different to those being used before or to be used thereafter. This is accomplished as follows, the graders or sorters working at the sorting or grading table place the material upon the conveyor belts leading to the segregator chains, if the machine as shown is to be used for four grades the conveyor belt 38 would receive all of the first grade materials, the belt 38ᵃ would transfer all of the second grade articles, the belt 36 would receive all of the class of the third grade and the belt 36ᵃ would transfer all of the fourth grade articles. If the machine is to be used in two grades only, the belts or conveyors upon one side would receive the articles of the first grade and the conveyor belts upon the other side would be used for articles of the second grade. Whereas of the materials would run heavy to articles of the first grade the two upper conveyor belts could be used for articles of the first grade, and the two lower conveyor belts for articles of the second and third grades. In this way it is clearly apparent that the machine may be readily used upon any combination of grading that the materials or quality may require. From each of the conveyor belts leading to the segregator chain is a deposit shoot for depositing the materials upon the segregator chain, and the same is preferably made of canvas or other flexible material that will standing the passing of the chain thereunder without showing undue wear upon the shoot material. These shoots are shown at best advantage in Fig. 3 shoot 37 leading from the conveyor belt 36 and shoot 39 leading from the conveyor 38, each of these shoots terminate upon their lower end where the same contacts with the segregator chain in a streamer end 37ª and 39ª, these streamer ends permit the deposit of the material directly upon the chain and the article finds lodgment into the pockets and upon the drop or hinged bottom of the chain without in any way being dropped or forced thereupon excepting in a gentle manner.

A description will now be made of the segregator chain and a disclosure made of the construction of the same, this is best shown in Fig 7 and Fig 8, in the form used I have made the side chain members 40 from sheet steel and from one piece, the two sides and the closed end being made from one piece, the side plates 40ª being sheared from the plate and leaving the part 41 to be later bent to the shape shown so that a pocket may be formed between the link proper and the hinged drop bottom 42 which has upturned edges 46, hinged member 42 is hinged about pin 43 which serves as the cross bar to hold the chain in alignment and at the same time for the support for the rollers 44 while these rollers are not absolutely necessary for the successful operation of my machine yet to facilitate ease of operation and to eliminate friction I prefer to use the same, the same contacts with shoe 47. The article to be sized is deposited upon the hinged member 42 and is permitted to pass through the opening created as the same is hinged about the cross bar as the chain progresses, supporting the hinged bottom upon the swinging end is sliding bar 45 which engages with the flexible shoe 48 which is usually placed in an incline so that as the chain progresses the bottom is permitted to drop down an increasing amount and the article is permitted to drop through between the end of the hinged link or bottom and the end 41 which is formed as the link member is made into shape. The segregator chain is caused to move in an approximate horizontal line and if the flexible link support were inclined in the direction of travel of the segregator chain it is apparent that the hinged bottom would be progressively lowered or hinged about the cross bar as the sliding bar which supports the hinged bottom contacts with the flexible link support and, therefore, that articles of a similar size will be deposited at a predetermined point in the travel of the segregator chain; in order that the article to be deposited may be placed in the bin without being damaged the same when it passes through the opening caused by the hinging down action of the hinged bottom is deposited upon a diaphragm of flexible material such as canvas or other suitable material that will not bruise or otherwise damage the article when released, this is shown at 49, the material or article then falls into the hopper or bin 50, these bins are separated by means of partition boards 51 so arranged that they may be removed or relocated so that the bins may be easily and readily enlarged or contracted to hold a larger or smaller amount as the demand requires, for a large amount or volume may be deposited in a certain bin during a part of the day's work and a smaller amount at certain other parts of the day, and the easy changing of these is essential to accommodate the needs as they arise, as found from actual practice. In order that the segregator chains may each deposit their respective segregated material upon the side where segregated a partition 52 is run the full length and a series of bins abutting the same are arranged upon either side of the same. The flexible links upon which the sliding bars 45 engage and are supported are shown at 53, each of these links are made of rigid material but when assembled they form a chain of links that have a flexibility of adjustment that forms a contour that may be one long slope, or that may be raised or lowered to suit the working conditions where the same are to be used, these links are secured to crank like members 54 and the links have slots 55 in at least one end where the same are mounted upon the links to provide a takeup, or compensation to permit the raising or lowering of the links at any desired location that the attendant may require to accommodate the segregator chain to a large run of articles of a similar size at any particular position in the travel of the chain that the same might occur at. Secured to the crank 54 is a lever 55ª which is secured to the crank in a rigid manner to prevent the turning of the same about the shaft of the crank to which it is attached, the lever 55ª terminates upon its one end in a point 56 for indicating upon a graduated quadrant 57 the location of the link 53 that is being supported upon the same. Located upon the side opposite that of the point of pivot to the graduated quadrant is a quadrant 58 having notches 59 into which a detent upon the underside of the lever 55ª engages for stopping the lever at any desired location and holding the same in position. This flexible and adjustable link support for the cross drag bars to govern the amount and location of hinging action of the hinged bottom is one of the main features of my invention as it makes possible for the attendant of the machine to make instant adjustment of the machine to meet the requirements of the demand of the machine without shutting the machine down to made the adjustments and without any advance preparation whatsoever. In some locations or packing houses or factories it may be required to make more sizes than will be required in other plants, and to provide a means for this I have interposed lifting cams in the line of travel of the segregator chain, in such location that when the number of sizes that are required have been made the cross drag bars or sliding bars 45 are lifted up to the initial position and the segregator chain will start on a new segregation at which point the conveyor belt and shoot will have been arranged to make the deposit of the graded material to be segregated. This is best shown in Fig. 10 the line of travel of the chain is in the direction indicated by the arrow and when the sliding bar 45 engages with the lifting cam 60 the same will be elevated and the hinged lid will be raised to the point 62 where the same will be permitted to move in a straight line for a period of time sufficient to permit the hinged lid to become stabilized and then allowed to cam down the links 61 until engagement is made with the line of links 53 where the cycle of operation permitting the hinged bottoms to be progressively hinged down allowing the deposit of the different gradients of sizes to pass through until the largest sizes to be segregated has taken place, the segregator chain will then pass around the driving sprocket and return to the driven sprocket 15 and the operation be repeated, as the segregator chain is an endless chain the machine is automatic once set in motion and is only changed as the adjustable link chain is adjusted for the different sizes that it is desired to segregate as the demand requires that it be done. I am aware that segregator devices have been developed for this work heretofore and I am somewhat familiar with the different types, but I feel that I have made substantial contributions to the segregator art and do not wish to be limited in my claims to the embodiments of the principles as herein shown but wish to claim broadly the general principles that are shown and that are new in the art for which this machine has been developed and having made a disclosure of my invention in such detail that any one may make the same that are skilled in the art, I therefore wish to make the following claims therefor—

1. The combination in a machine of the character described of a segregator endless chain adapted to run and be driven over sprockets, having a hinged bottom member supported upon its hinging end by a sliding bar adapted to move along adjustable link supports to govern the time and location of the opening to be created by the hinging down of the hinged bottom.

2. The combination in a machine of the character described, of a segregator chain made of links and cross bars secured to each other so as to form an endless chain and being driven about sprockets, a hinged member arranged within the respective links adapted to create an opening in enlarged degree during the travel of the chain, means for restoring the hinged member to closed position during travel, and means for adjusting the opening amount without stopping the chain travel.

3. The combination in a machine of the character described, of a segregator chain passing about sprockets adapted to be driven, means within the chain to permit openings in increasing amount as the chain progresses, means for depositing articles to be segregated upon the chain and means for receiving the articles upon flexible diaphragms when released through the openings created, and means for closing the openings one or more times in the progression of the chain in its line of travel.

4. In a machine of the class described, a plurality of receptacles arranged in endless series and adapted to be actuated progressively through the machine, openable bottoms, beneath the receptacles, and means consisting of rearwardly converging side members associated with said bottoms for guiding the discharge of articles therefrom.

5. In a machine of the class described, a plurality of receptacles arranged in endless series and adapted to be actuated progressively through the machine, openable bottoms in each receptacle, means associated with said bottom for guiding the discharge of articles therefrom, and a track composed of fixed and movable elements whereby said bottoms may be successively closed and thereafter progressively opened to a predetermined extent.

6. In a machine of the class described, the combination of a segregator chain, a hinged bottom associated therewith, a sliding bar associated with one end of said hinged bottom, means associated with said sliding bar for regulating the movement of the same and means associated with said last mentioned means for predeterminately adjusting and indicating the position of the same.

7. The combination in a machine of the character described, of a segregator chain passing about sprockets adapted to be driven, a hinged bottom member associated with said segregator chain, a plurality of tracks for supporting said segregator chain, supporting means for said track and an adjusting and indicating means associated with said supporting means.

8. In a machine of the class described, the combination of a table having a plurality of V-shaped channels arranged longitudinally therein, one side of each of said V-shaped channels being highly polished and an endless belt in each of said channels having a flat engagement with one of the sides of its respective channel.

9. In a machine of the class described, the combination of a table having a plurality of V-shaped channels arranged longitudinally therein, one side of each of said channels being made of highly polished material, and an endless belt in each of said channels having a flat engagement with the side opposite to the polished surface of its respective channel.

10. The combination in a machine of the class described, of a segregator chain passing about sprockets and adapted to be driven, a hinged bottom member associated with said segregator chain, a plurality of tracks for supporting said segregator chain, supporting means for said tracks, track operating levers carried by said track supporting means, and indicating and locking means associated with said track operating levers as and for the purpose described.

In testimony that I claim the foreging as my own I hereunto attach my signature in the presence of two witnesses.

DAVID B. CARR.

Witnesses:
    JOHN T. ANDERSON,
    RAYMOND H. GASTON.